United States Patent [19]

Ueno et al.

[11] 4,062,804

[45] Dec. 13, 1977

[54] PROCESS FOR THE PRODUCTION OF A CATALYST COMPONENT FOR USE IN THE POLYMERIZATION OF ALPHA OLEFINS

[75] Inventors: Hiroshi Ueno; Naomi Inaba, both of Ohi; Tokuo Makishima, Kawagoe; Shozo Wada, Zushi, all of Japan

[73] Assignee: Toa Nenryo Kogyo Kabushiki Kaisha, Tokyo, Japan

[21] Appl. No.: 703,562

[22] Filed: July 8, 1976

[30] Foreign Application Priority Data

July 9, 1975 Japan .................................. 50-83561

[51] Int. Cl.$^2$ ................................................ C08F 4/64
[52] U.S. Cl. ............................... 252/429 B; 526/142; 526/159
[58] Field of Search ...................................... 252/429 B

[56] References Cited

U.S. PATENT DOCUMENTS

| 3,769,233 | 10/1973 | Hermans et al. ............. 252/429 B X |
| 3,825,524 | 7/1974 | Wada et al. ................. 252/429 B X |
| 3,862,257 | 1/1975 | Buben et al. ................. 252/429 B X |
| 3,960,765 | 6/1976 | Shiga et al. ....................... 252/429 B |
| 3,984,350 | 10/1976 | Karayannis et al. ............. 252/429 B |

*Primary Examiner*—Patrick P. Garvin
*Attorney, Agent, or Firm*—Ben C. Cadenhead; William T. Clarke

[57] ABSTRACT

The invention relates to a method for preparing a catalyst composition for polymerization of propylene, having high activity and producing polypropylene of high stereoregularity in narrow particle size distribution, which comprises:
1. reducing $TiCl_4$ by a mixture of diethylaluminum chloride (DEAC) and ethylaluminum dichloride (EADC), thereby forming a reduced solid ($TiCl_3$),
2. removing the aluminum compound from the reduced solid;
3. treating the said reduced solid with a mixture or complex of $TiCl_4$ and diisoamylether (IAE), and
4. separating the solid catalyst from the solution.

Preferably step 2 is performed by washing with a complexing agent for the aluminum compound.

7 Claims, No Drawings

PROCESS FOR THE PRODUCTION OF A CATALYST COMPONENT FOR USE IN THE POLYMERIZATION OF ALPHA OLEFINS

FIELD OF THE INVENTION

This invention relates to an improvement in a catalyst component for use in the polymerization of α-olefins (which will hereinafter be referred to as "catalyst component") and more particularly, to a process for the production of a catalyst component capable of producing polymer having a narrow particle size distribution whereby in the stereoregular polymerization of α-olefins such as propylene, in particular, not only the stereoregularity is improved but also the polymerization speed is markedly increased.

As a method of producing a crystalline polyolefin on a commercial scale, it has been widely known to use a polymerization catalyst comprising, in combination, a catalyst component consisting of a low valence transition metal halide, and an organo metal halide compound. In particular, a titanium trichloride composition has been used as the low valence metal halide.

A known method of preparing a titanium trichloride composition consists in reducing titanium tetrachloride by metallic aluminum at a high temperature and then grinding the product for activation. The catalyst component prepared in this way is ordinarily called Grade AA titanium trichloride, which contains, in addition to titanium trichloride, aluminum chloride in an eutectic form, but has the disadvantage that when used as a polymerization catalyst, the polymerization speed and the stereoregularity of the product are unsatisfactory and, on a commercial scale, a large amount of the expensive catalyst is necessary while a great cost is simultaneously required for the treatment of non-crystalline polymer byproducts.

Many efforts have been made to overcome these disadvantages. For example, some of the catalytic components have been removed to improve somewhat the polymerization speed or stereoregularity by extracting with a solvent (Soga et al. "Shokubai (Catalysts)" Vol. 11, page 75 (1969)), reacting with an ether compound followed by washing (Japanese Patent Application (OPI) No. 34281/1973 or grinding together with various materials followed by solvent extraction (Japanese Patent Publication No. 26376/1972). In these methods, however, the particle size distribution of the catalytic component has not been sufficiently improved, so that a polymer obtained using this catalyst component may also have a wide particle size distribution, resulting in trouble in handling this polymer powder.

Another known method of preparing a titanium trichloride composition consists in reducing titanium tetrachloride with diethylaluminum chloride in a proportion substantially equimolar or less to the titanium atom present at low temperature, as disclosed in, for example, Japanese Patent Publication Nos. 10415/1971, 21575/1972 and 11807/1972. This method has the advantage that a catalytic component with a relatively even particle size can be obtained, but, on the other hand, the titanium trichloride composition obtained by this method is a brown β-type titanium trichloride composition whose polymerization capacity is very inferior. Therefore, it is necessary to subject this composition to a heat activation treatment to convert it into a violet titanium trichloride composition. In this case, however, the polymerization speed and stereoregularity when used as a polymerization catalyst are not superior to those in the case of using the above described Grade AA titanium trichloride. The alkylaluminum dihalide byproduct of the reduction in the above-described method is regarded as a harmful material to the catalytic component and, as described in the above-publications, for example, Japanese Patent Publication No. 10415/1971, therefore, it is recommended to process it with a complexing agent such as ether compounds. Even if this processing is carried out when the reduced solid is subjected to a heating and activating treatment, the catalytic activity of the resulting component is deficient.

As a further method of preparing a titanium trichloride composition, it has been proposed to obtain a catalyst component capable of giving a relatively high polymerization speed, high stereoregularity and excellent particle size distribution by reducing titanium tetrachloride by diethylaluminum chloride at a low temperature to form a β-type titanium trichloride composition and then treating it with a complexing agent and titanium tetrachloride to convert into a violet δ-type catalyst solid, as disclosed in Japanese Patent Application (OPI) No. 34478/1972 (published on Nov. 21, 1972). However, this method has the disadvantage that when using a complexing agent other than diisoamyl ether, the titanium trichloride composition is not substantially improved and further it is necessary to use a reagent having a concentration of 15% by volume or more, preferably 30 to 40% by volume when treating titanium tetrachloride. Since diisoamyl ether is an expensive reagent which is 10 to 20 times more expensive than other organic ether compounds or about 10 times more expensive than the marketed Grade AA titanium trichloride, the above-described method has the disadvantage that the production cost of the catalyst component on a commercial scale is high even though the product exhibits excellent properties as a catalyst.

SUMMARY OF THE INVENTION

In accordance with the present invention, it has been found that a catalyst component having excellent catalytic properties can be obtained by reducing titanium tetrachloride with dialkylaluminum monohalide and, in addition, alkylaluminum dihalide. Further processing results in a catalyst component having a largely improved polymerization activity and the capability to produce polymer having high stereoregularity and narrow particle size distribution.

Thus, the present invention provides a process for the production of a catalyst component for use in the polymerization of α-olefins, which comprises reacting titanium tetrachloride with a dialkylaluminum monohalide and monoalkylaluminum dihalide (said dialkylaluminum monohalide being in a proportion of equimolar or more to said titanium tetrachloride) to thus obtain a violet reduced solid, then removing aluminum compounds contained in said reduced solid and further activating with a complex consisting of diisoamyl ether and titanium tetrachloride or a mixture of diisoamyl ether and titanium tetrachloride.

Useful examples of the dialkylaluminum monohalide which can be used for the reduction of titanium tetrachloride in the process of the invention are dimethylaluminum chloride, diethylaluminum chloride, dibutylaluminum chloride, diethylaluminum bromide, diethylaluminum iodide and the like. Diethylaluminum chloride is preferable because it is readily obtainable commercially and also excellent in processing capacity.

Useful examples of the monoalkylaluminum halide to be present together with the dialkylaluminum monohalide in the process of the invention are methylaluminum dichloride, ethylaluminum dichloride, butylaluminum dichloride, ethylaluminum dibromide and ethylaluminum diodide. Ethylaluminum dichloride is preferably used.

For purposes of illustration and not limitation, the present invention will now be described using ethylaluminum dichloride and diethylaluminum chloride in combination.

As described above, the method of reducing titanium tetrachloride by diethylaluminum chloride is well known to those skilled in the art. This reaction can be represented by the following relations:

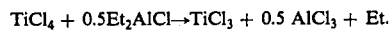

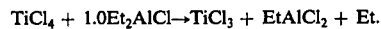

As is apparent from these relations, the ratio of diethylaluminum chloride and titanium tetrachloride is ordinarily 0.5:1 to 1.0:1. It is well known that the compound formed by this reaction, i.e., ethylaluminum dichloride is a harmful material to the polymerization reaction and, therefore, efforts have been made to remove it as far as possible after the reducing reaction. However, the inventors have found that a violet reduced solid is obtained by reducing titanium tetrachloride by diethylaluminum chloride in a proportion of 1 mol or more to 1 mol of the titanium tetrachloride and ethylaluminum dichloride in a suitable amount, in particular, in a proportion of 0.3 to 1.2 mol to 1 mol of the titanium tetrachlorde. This phenomenon is very interesting in view of the fact that only a brown reduced solid is obtained according to the prior art method, that is, in the case of effecting the reduction with diethylaluminum monochloride only without ethylaluminum dichloride. X-ray diffraction spectra show that, in the case of a brown reduced solid obtained by the prior art method, the peak of β-type crystal is considerably larger than the peak of Δ-type crystal, while in the case of a violet reduced solid obtained according to the present invention, the peak of β-type crystal is very small or scarcely appears and the peak of α-type crystal appears strongly.

In the present invention, aluminum compounds contained in the violet reduced solid are removed and then the reduced solid is subjected to an activation treatment using a complex consisting of diisoamyl ether and titanium tetrachloride or a mixture of diisoamyl ether and titanium tetrachloride. Even in the combination of the prior art method, that is, for removing aluminum compounds with a heating and activating treatment, the catalyst component obtained is not substantially improved, while according to the present invention, a great advantage is obtained by the use of a small amount of a complex consisting of diisoamyl ether and titanium tetrachloride or a mixture of diisoamyl ether and titanium tetrachloride.

It is another feature of the present invention that the method of removing aluminum compounds contained in the reduced solid is not limited to treatment with a specific complexing agent, but that any of several methods can effectively be used. The known method has hitherto succeeded in obtaining a relatively large improvement by the combination of the method of removing aluminum compounds by treating with a complexing agent followed by an activation treatment with titanium tetrachloride, but, on the other hand, has the disadvantage that a large improvement cannot be obtained when another complexing agent than diisoamyl ether is used. In fact, according to our tracing experiments, the improvement is very unsatisfactory even when the reduced solid is treated with, for example, di-n-butyl ether and then activated by titanium tetrachloride only, as shown in the following Comparative Examples.

According to the present invention, on the contrary, the removal of aluminum compounds can be carried out not only by the use of a specific compound such as diisoamyl ether but also by the application of the known techniques, so long as the activation is carried out using a complex or mixture of titanium tetrachloride and diisoamyl ether.

It is very difficult to explain why a complex or mixture of titanium tetrachloride and diisoamyl ether has a particular action in the final processing step of the catalyst component in the present invention, but it is true that there is a difference as to the object of using diisoamyl ether between the present invention and the above described known method, since the quantity of diisoamyl ether used in the former is small while the quantity of diisoamyl ether used in the latter is very large, that is, 0.8 to 1 mol per 1 mol of titanium. This is possibly due to the fact that diisoamyl is used for the particular activation action in the present invention, while diisoamyl ether is used for the purpose of removing aluminum compounds present in a large quantity in the known method.

A further feature of the invention consists in the quantity of complexing agent and diisoamyl ether present in the finally processed solid. This is to say, in the present invention, there remain in the final catalyst solid a considerable quantity of complexing agent and diisoamyl ether even after the reduced solid is treated with the complexing agent to remove aluminum compounds, subjected to activation with a complex or mixture of diisoamyl ether and titanium tetrachloride, washed several times with a fresh solvent and then dried. It is a well known fact in the art that if there are large amounts of such compounds in the catalyst solid, the polymerization properties, and especially the stereoregularity of the product are markedly lowered and it is confirmed as shown in the following Comparative Example that the stereoregularity is markedly reduced if the polymerization is carried out with addition of a complexing agent corresponding, in variety and quantity, to titanium trichloride. Therefore, it is surprising that the catalyst solid of the present invention is capable of yielding a product having a high degree of stereoregularity in spite of the fact that it contains large amounts of a complexing agent together with diisoamyl ether and it will clearly be understood from this that diisoamyl ether used in the present invention is an essential condition for producing a catalyst solid capable of giving a polymer with a high degree of stereoregularity.

The catalyst component produced by the process of the invention having the above described features is, excellent in activity and produces polymer having a low particle size distribution as is apparent from Examples, and, furthermore, the process of the invention is economical because diisoamyl ether is used in small quantities.

The reducing reaction of the invention is carried out by contacting titanium tetrachloride with a reducing agent consisting of a monoalkylaluminum dihalide and dialkylaluminum monohalide, for example, ethylaluminum dichloride and diethylaluminum monochloride in an inert diluent. In the present invention, in particular, the reducing agent used for the reduction of titanium tetrachloride is a mixture of diethyl aluminum chloride in a quantity of equimolar or more to titanium tetrachloride and ethylaluminum dichloride in a suitable quantity. Where the quantity of diethylaluminum chloride used is less than that of equimolar to titanium tetrachloride, no favorable results are obtained. On the other hand, the quantity of ethylaluminum dichloride used is preferably within a range of 0.3 to 1.2 mol per 1 mol of titanium tetrachloride. As the inert diluent, $C_4$ to $C_{12}$ aliphatic hydrocarbons substantially free of aromatic hydrocarbons or alicyclic hydrocarbons. The temperature of the reducing reaction is relatively important for the properties of the final product and should be adjusted within a range of $-50°$ to $+30°$ C. The reaction is begun by contacting titanium tetrachloride with the reducing agent while agitating the mixture, resulting in deposition of the reduced solid, insoluble in the inert diluent. Contacting is carried out by adding dropwise either a solution of titanium tetrachloride or a solution of reducing agent to the other. All the solutions are preferably agitated for 1 hour or more, in partiular, 3 hours or more and during the same time, the reaction system should be kept at the above-described temperature. After both the solutions are completely mixed, the mixture is kept at the same temperature for at least 30 minutes, preferably 1 hour or more, then gradually heated and kept for 15 minutes or more at a constant temperature between 20° and 120°, preferably 60° and b 100° C. with continuous agitation. The reduced solid obtained in this way should be thoroughly washed with a fresh solvent.

The aluminum compounds contained in the thus resulting reduced solid can be removed by known techniques, for example, by subjecting the solid to a high vacuum to sublimate the aluminum compounds or by treating the reduced solid with a compound capable of forming a complex compound with the aluminum compounds (i.e., complexing agent) and then extracting with a solvent. As the complexing agent (generally a Lewis base), there are used, for example, ethers, thioethers, thiols, organo phosphorus compounds, organo nitrogen compounds, ketones or esters.

Examples of ether complexing agents are diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, anisole, phenetole, chloroanisole, bromoanisole and dimethoxybenzene.

Examples of the thioether complexing agents are diethyl thioether, di-n-propyl thioether, dicyclohexyl thioether, diphenyl thioether, ditolyl thioether, ethyl phenyl thioether, propyl phenyl thioether and diallyl thioether.

Examples of the organo phosphorus complexing agents are tri-n-butylphosphine, triphenylphosphine, triethyl phosphite and tributyl phosphite. Examples of the organo nitrogen compounds are diethylamine, triethylamine, n-propylamine, di-n-propylamine, tri-n-propylamine and dimethylaniline.

Ethers, in particular, having 4 to 16 carbon atoms are preferably as complexing agents. The extraction can be carried out by any known methods, for example, by stirring the reduced solid with an ether compound in an inert medium and separating into a liquid phase and solid phase. Such a medium may be the same as that used in the reducing reaction. The extraction is ordinarily carried out at a constant temperature between 0° to 80° C, for 5 minutes or more, for example, 30 minutes to 2 hours. The quantity of complexing agent used is ordinarily 0.1 to 2.5 mols, preferably 0.4 to 1.0 mol per 1 mol of titanium atom in the reduced solid.

The solid obtained by the above-described treatment is then subjected to an activation treatment with a complex consisting of diisoamyl ether and titanium tetrachloride or a mixture of diisoamyl ether and titanium tetrachloride. Preparation of such a complex consisting of diisoamyl ether and titanium tetrachloride can be carried out by contacting both the compounds in equimolar amounts as it is or in a hydrocarbon solvent at room temperature or with heating. This complex is a green plate crystal, complex compound of equimolar diisoamyl ether and titanium tetrachloride, which can be confirmed by analysis after purification, for example, by recrystallization using a hydrocarbon solvent. In the activation treatment with a complex according to the present invention, the thus prepared complex is used. The treatment of the solid with a mixture of diisoamyl ether and titanium tetrachloride can be carried out by mixing the solid with diisoamyl ether and titanium tetrachloride, but it is preferable to mix both previously before use thereof. The quantity of diisoamyl ether used in the activation treatment should be 0.1 mol or more per 1 mol of titanium trichloride in the solid whether the complex or mixture is used. If less than this range of ether is used, the resulting catalyst component is unsatisfactory in polymerization acitivity and stereoregularity and if more is used, the particle size distribution of the catalyst component treated is broadened resulting in an increase of the proportion of fine powder in the product, in addition to poor economy, i.e. use of an excess of an expensive reagent. Therefore, in fact, the quantity of diisoamyl ether is preferably 0.1 to 0.6 mol per 1 mol of titanium trichloride. On the other hand, the quantity of titanium tetrachloride is so adjusted that the concentration thereof may be 1% by volume or more, preferably, 5% by volume or more of the whole liquid phase throughout the treatment. This activation treatment is ordinarily carried out using a hydrocarbon solvent such as pentane, hexane, heptane, octane, cyclohexane or cyclopentane in such a manner that the solid concentration in the treating system be 50 to 800 g/l, preferably, 200 to 600 g/l. The temperature of the activation treatment is ordinarily within a range of $-30°$ to 100° C., preferably 40° to 80° C. and the time required for the activation is sufficiently 30 minutes but should be 1 to 3 hours so as to obtain good results with a high reproducibility. Then the thus treated solid should thoroughly be washed with the hydrocarbon solvent used in the above-described treatment.

The thus obtained catalyst component is used for the polymerization together with a co-catalyst component. As the co-catalyst, organometallic compounds of Group I, II and III elements of the Periodic Table are used. In particular, organic aluminum compounds are preferably used and, above all, triethylaluminum and diethylaluminum chloride are most suitable for the polymerization of propylene. Any polymerization methods known in the art can be used. For example, as an economical method, a liquid monomer may be used as a polymerization medium without using a polymerization diluent or a gaseous monomer may be used similarly.

The present invention will be illustrated in detail by the following Examples.

EXAMPLE 1

700 ml of purified heptane and 250 ml of titanium tetrachloride were charged in a 2000 ml flask equipped with a stirrer and kept at 0° C. in a bath. 315 ml of diethylaluminum chloride (1.1 mol to 1 mol of titanium tetrachloride) and 117 ml of ethylaluminum dichloride (0.5 mol to 1 mol of titanium tetrachloride) were dissolved in 400 ml of heptane and added dropwise from a dropping funnel. The dropping was continued for a period of time of about 3 hours and, during the same time, the reaction system was kept at 0° C. After the dropwise addition, the reaction mixture was gradually heated for 1 hour to 65° C. with agitation. The reaction was further continued at the same temperature for another hour. After completion of the reaction, the reaction mixture was allowed to stand to separate the solid formed and the solid was washed with 150 ml of purified heptane three times, followed by drying at 65° C. for 30 minutes under reduced pressure. The thus reduced solid was red violet and, according to X-ray diffraction spectrum, the peaks of $2\theta = 15.1°$, 33° and 51.3° ($\alpha$-type crystal) were found but the peaks of $2\theta = 16.3°$ and 42.4° ($\beta$-type crystal) were not found or very small if found. The particle size distribution of the product was very narrow and there was 1% or less of particles of 5 microns or less. The molar ratio of Al/Ti in the reduced solid was 0.57.

150 g. of the reduced solid was suspended in 1850 ml of purified heptane, to which 127 ml (equimolar to the titanium in the reduced solid) of di-n-butyl ether (referred hereinafter to as "NBE") was dropwise added for 10 minutes with agitation at room temperature, and the mixture was reacted at 35° C. for 1 hour. After the reaction, the reduced solid was washed three times with 500 ml of purified heptane to remove aluminum compounds contained therein, followed by drying at 65° C. for 30 minutes under reduced pressure.

30 g. of the solid, from which the aluminum compounds were substantially removed by the above-described treatment, were resuspended in 53 ml. of purified heptane, to which 47.6 ml of a heptane solution of an equimolar complex of diisoamyl ether (referred hereinafter to as "IAE") and titanium tetrachloride, adjusted previously to a concentration of 2 mols/l, was added, and the mixture was reacted at 65° C. for 2 hours. The molar ratio of IAE to titanium trichloride was 0.6 and the proportion of titanium tetrachloride to the whole liquid phase was 10% by volume. After the reaction, the solid was washed three times with 100 ml of purified heptane, followed by drying at 65° C. for 30 minutes under reduced pressure.

The catalyst solid obtained in this way also had a narrow particle size distribution and there was only 2% of fine powder of 5 microns or less. Moreover, the catalyst solid contained NBE and IAE amounting to 0.09 mol and 0.15 mol respectively per 1 mol of the titanium in spite of repeated washing and drying. The molar ratio of Al/Ti in the solid was 0.015.

100 mg of the catalyst solid was charged in an autoclave of 1000 ml, to which 180 mg of diethylaluminum chloride as co-catalyst, 600 ml (Standard State) of hydrogen as a molecular weight regulator and 800 ml of liquid propylene were added. The polymerization was carried out at a temperature of 68° C. for 30 minutes and the unreacted propylene was removed by flashing, thus obtaining 193 g of polypropylene powder. Thus the polymer yield per 1 g of the catalyst solid (catalyst efficiency, referred hereinafter to as "E") was 1930. This polymer had a melt flow rate of 4.5 (Melt Flow Rate — ASTM D 1238-referred to as "MFR") and a heptane insoluble content of 97% (referred hereinafter to as "HI"), which was measured by extracting with heptane for 5 hours by means of a Soxhlet extractor.

The results are shown in Table I.

COMPARATIVE EXAMPLE 1

The procedure of Example 1 was repeated except that the activation treatment with the complex consisting of titanium tetrachloride and IAE was not carried out and the polymerization test was immediately carried out, thus obtaining results as shown in Table I.

It is apparent from these results that the activation treatment with the complex is essential.

COMPARATIVE EXAMPLE 2

The procedure of Example 1 was repeated except that the activation treatment with the complex consisting of titanium tetrachloride and IAE was not carried out and instead a heating and activating treatment was carried out at 150° C. for 1 hour, thus obtaining results shown in Table I.

It is apparent from these results that a marked improvement cannot be expected by an activation treatment by heating even after removing aluminum compounds.

COMPARATIVE EXAMPLE 3

The procedure of Example 1 was repeated except that, in place of the activation treatment with the complex consisting of titanium tetrachloride and IAE, an activation treatment with titanium tetrachloride having the same concentration was carried out, thus obtaining results shown in Table I.

It is apparent from these results that a marked improvement cannot be expected by activating with titanium tetrachloride alone even after aluminum compounds are removed and it is thus essential to add IAE at the time of treatment with titanium tetrachloride.

TABLE I

|  | Example 1 | Comparative Example 1 | Comparative Example 2 | Comparative Example 3 |
|---|---|---|---|---|
| IAE/TiCl$_3$ (Molar Ratio) | 0.6 | — | — | — |
| Quantity of TiCl$_4$ in whole Liquid Phase (vol.%) | 10 | — | — | 10 |
| Quantity of Ether Remaining (Mol) | 0.24 | 0.56 | 0.09 | 0.08 |
| Al/Ti (Molar Ratio) | 0.015 | 0.08 | 0.07 | 0.014 |
| Quantity of Particles of 5 $\mu$ or less in | 2 | 2 | 2 | 2 |

TABLE I-continued

|  | Example | Comparative Example | | |
|---|---|---|---|---|
|  | 1 | 1 | 2 | 3 |
| Catalyst Solid (%) |  |  |  |  |
| E | 1930 | 720 | 420 | 1250 |
| HI | 97 | 55 | 93 | 96 |
| MFR | 4.5 | 10 | 3.9 | 4.9 |

COMPARATIVE EXAMPLE 4

The procedure of Example 1 was repeated except that, in place of the NBE treatment, a treatment with a mixture of 0.5 mol of NBE and 0.5 mol of IAE per 1 mol of titanium trichloride was carried out to remove aluminum compounds and then an activation treatment was carried out with a solution of titanium tetrachloride having the same concentration. The molar ratio of Al/Ti in the resulting catalyst solid was 0.021. The polymerization results were E = 1270, HI = 95 and MFR = 6.0.

It is apparent from these results that the use of a small amount of IAE at the time of removing aluminum compounds is not so effective for the activation and, that is to say, it is essential to use the same when effecting the activation by titanium tetrachloride.

COMPARATIVE EXAMPLES 5 AND 6

Using titanium trichloride of Grade AA manufactured by Toyo Stauffer Co., a polymerization test was carried out (Comparative Example 5). On the other hand, another polymerization test was carried out with addition of an ether compound in the same quantity as that remaining in the catalyst solid obtained in Example 1 (Comparative Example 6).

The results are shown in Table II, from which it is evident that the catalyst obtained by the present invention is very excellent in activity, HI and particle size distribution and capable of giving excellent properties in spite of that there remain a large quantity of an ether compound in the catalyst solid. This is a very interesting phenomenon.

TABLE II

|  | Comparative Example | |
|---|---|---|
|  | 5 | 6 |
| Quantity of Ether Added (Mol) | — | 0.24 |
| Quantity of Particles of 5 μ or less size in Catalyst Solid (%) | 12 | 12 |
| E | 450 | 610 |
| HI | 93 | 82 |
| MFR | 4.7 | 8.0 |

EXAMPLES 2 TO 4

The procedure of Example 1 was repeated except the quantity of the equimolar complex of IAE and titanium tetrachloride was varied, thus obtaining results as shown in Table III.

EXAMPLE 5

The procedure of Example 1 was repeated except that, in place of the complex consisting of titanium tetrachloride and IAE, titanium tetrachloride and IAE were separately added to the processed solid to activate it, thus obtaining results shown in Table III.

TABLE III

|  | EXAMPLE | | | |
|---|---|---|---|---|
|  | 2 | 3 | 4 | 5 |
| IAE/TiCl₃(Molar Ratio) | 0.1 | 0.3 | 2.4 | 0.6 |
| Quantity of TiCl₄ in Whole Liquid Phase (% by volume) | 1.5 | 5 | 40 | 10 |
| Quantity of Ether Remaining (Mol) | 0.28 | 0.25 | 0.20 | 0.28 |
| Al/Ti (Molar Ratio) | 0.018 | 0.025 | 0.10 | 0.13 |
| Quantity of Particles of 5 μ or less size in Catalyst Solid (%) | 1 | 1 | 8 | 3 |
| E | 1370 | 1550 | 2300 | 1800 |
| HI | 89 | 93 | 97 | 95 |
| MFR | 3.9 | 5.0 | 5.0 | 4.2 |

EXAMPLES 6 TO 12

The procedure of Example 1 was repeated except that mixtures of IAE and titanium tetrachloride in various proportions, previously prepared, were used in place of the complex consisting of titanium tetrachloride and IAE, thus obtaining results as shown in Table IV.

Table IV

|  | Example | | | | | | |
|---|---|---|---|---|---|---|---|
|  | 6 | 7 | 8 | 9 | 10 | 11 | 12 |
| IAE/TiCl₃ (Molar Ratio) | 0.1 | 0.3 | 1.0 | 0.1 | 0.3 | 0.6 | 1.0 |
| Quantity of TiCL₄ in Whole Liquid Phase (% by volume) | 10 | 10 | 10 | 40 | 40 | 40 | 40 |
| Quantity of Ether Remaining (Mol) | 0.22 | 0.17 | 0.24 | 0.19 | 0.16 | 0.13 | 0.13 |
| Al/Ti (Molar Ratio) | 0.017 | 0.018 | 0.020 | 0.019 | 0.018 | 0.015 | 0.020 |
| Quantity of Particles of 5 μ or less size in catalyst solid (%) | 1 | 2 | 4 | 1 | 2 | 3 | 7 |
| E | 1620 | 2120 | 1760 | 1790 | 2250 | 2220 | 1980 |
| HI | 97 | 97 | 97 | 97 | 98 | 98 | 95 |

Table IV-continued

| | Example | | | | | | |
|---|---|---|---|---|---|---|---|
| | 6 | 7 | 8 | 9 | 10 | 11 | 12 |
| MFR | 4.8 | 5.0 | 7.1 | 3.9 | 7.2 | 6.1 | 5.2 |

COMPARATIVE EXAMPLES 7 TO 9

The procedure of Comparative Example 3 was repeated except varying the concentration of titanium tetrachloride in the whole liquid phase, thus obtaining results as shown in Table 5. It is apparent from these results that the activation treatment using the complex of mixture of the present invention is very excellent.

Table V

| | Comparative Examples | | | |
|---|---|---|---|---|
| | 7 | 8 | 3 | 9 |
| Quantity of TiCl₄ in Whole Liquid Phase (% by Volume) | 1.5 | 5 | 10 | 40 |
| Quantity of NBE Remaining (Mol) | 0.12 | 0.11 | 0.08 | 0.06 |
| Al/Ti (Molar Ratio) | 0.023 | 0.031 | 0.014 | 0.016 |
| Quantity of Particles of 5 μ or less size in Catalyst Solid (%) | 1 | 1 | 2 | 2 |
| E | 820 | 1050 | 1250 | 1340 |
| HI | 81 | 92 | 96 | 95 |
| MFR | 8.9 | 3.9 | 4.9 | 7.0 |

COMPARATIVE EXAMPLES 10 TO 19

The procedure of Example 1 was repeated except effecting the reduction of titanium tetrachloride using diethylaluminum chloride only as a reducing agent instead of the reducing agent consisting of diethylaluminum chloride and ethylaluminum dichloride and effecting the activation treatment, after the NBE treatment, using a complex consisting of IAE and titanium tetrachloride (Comparative Examples 10 to 12), a mixture of IAE and titanium tetrachloride (Comparative Examples 13 to 16) and titanium tetrachloride only (Comparative Examples 17 to 19), thus obtaining results shown in Table VI. It will clearly be understood from these results that the joint use of ethylaluminum dichloride during the reducing reaction results in a remarkable improvement of not only the catalytic activity but also the particle size property of the catalyst.

TABLE VI

| | COMPARATIVE EXAMPLE | | | | | | | | | |
|---|---|---|---|---|---|---|---|---|---|---|
| | 10 | 11 | 12 | 13 | 14 | 15 | 16 | 17 | 18 | 19 |
| IAE/TiCl₃ (Molar Ratio) | 0.1 | 0.3 | 0.6 | 0.1 | 0.3 | 0.1 | 0.6 | — | — | — |
| Quantity of TiCl₄ in Whole Liquid Phase (% by Volume) | 1.5 | 5 | 10 | 10 | 10 | 40 | 40 | 1.5 | 10 | 40 |
| Quantity of Ether Remaining (Mol) | 0.17 | 0.24 | 0.2 | 0.20 | 0.23 | 0.15 | 0.18 | 0.11 | 0.08 | 0.05 |
| Al/Ti (Molar Ratio) | 0.018 | 0.025 | 0.017 | 0.021 | 0.019 | 0.015 | 0.012 | 0.022 | 0.018 | 0.015 |
| Quantity of Particles of 5 μ or less size in Whole Liquid Phase (%) | 2 | 2 | 3 | 2 | 2 | 4 | 15 | 4 | 6 | 15 |
| E | 1150 | 1280 | 1500 | 1270 | 1470 | 1310 | 1620 | 750 | 1050 | 1090 |
| HI | 89 | 93 | 97 | 96 | 96 | 97 | 97 | 75 | 94 | 96 |
| MFR | 3.9 | 5.0 | 5.1 | 4.8 | 5.0 | 3.9 | 5.9 | 7.8 | 3.0 | 6.1 |

EXAMPLES 13 TO 16

The procedure of Example 1 or Example 9 was repeated except varying the quantity of NBE used, thus obtaining results shown in Table VII. It is evident from these results that the effect of the quantity of NBE necessary for removing aluminum compounds is not so large within the examined range.

TABLE VII

| | EXAMPLE | | | |
|---|---|---|---|---|
| | 13 | 14 | 15 | 16 |
| NBE/TiCl₃ (Molar Ratio) | 0.5 | 0.8 | 1.5 | 0.5 |
| IAE/TiCl₃ (Molar Ratio) | 0.6 | 0.6 | 0.6 | 0.3 |
| Quantity of TiCl₄ in Whole Liquid Phase (% by volume) | 10 | 10 | 10 | 40 |
| Quantity of Ether Remaining (Mol) | 0.25 | 0.24 | 0.26 | 0.15 |
| Al/Ti (Molar Ratio) | 0.018 | 0.017 | 0.015 | 0.015 |
| Quantity of Particles of 5 μ or less size in catalyst solid | 1 | 1 | 2 | 3 |
| E | 1900 | 2050 | 1970 | 2180 |
| HI | 97 | 97 | 97 | 98 |
| MFR | 3.9 | 4.6 | 5.5 | 4.9 |

EXAMPLE 17

The procedure of Example 1 was repeated except using IAE in an amount equimolar to titanium in the reduced solid instead of NBE used for removing aluminum compounds in the reduced solid. Consequently, the quantity of particles of 5 microns or less in the catalyst solid was 2%, the quantity of ether remaining was 0.21 mol and Al/Ti ratio was 0.021 (molar ratio). E = 1890, HI = 97 and MFR = 6.1

EXAMPLES 18 TO 20, COMPARATIVE EXAMPLES 20 TO 22

The procedure of Example 1 was repeated except using various complexing agents in an equimolar amount to titanium trichloride in place of NBE used for removing aluminum compounds, thus obtaining the results shown in Table VIII.

For comparison, the same complexing agents were used and thereafter an activiation treatment with titanium tetrachloride only was carried out instead of the activation treatment with the complex consisting of titanium tetrachloride and IAE. The results are shown in Table VIII.

It is evident from these results that various compounds can be used for removing aluminum compounds and it is essential to add IAE in the subsequent activation treatment.

Table VIII

|  | Example | | | Comparative Example | | |
|---|---|---|---|---|---|---|
|  | 18 | 19 | 20 | 20 | 21 | 22 |
| Complexing Agent | Tributyl-amine | Ethyl Benzoate | Methyl Trichloro-acetate | Tributyl-amine | Ethyl Benzoate | Methyl Trichloro-acetate |
| IAE/TiCl$_3$ (Molar Ratio) | 0.6 | 0.6 | 0.6 | — | — | — |
| Quantity of TiCl$_4$ in Whole Liquid Phase (% by volume) | 10 | 10 | 10 | 10 | 10 | 10 |
| Al/Ti (Molar Ratio) | 0.018 | 0.021 | 0.39 | 0.028 | 0.029 | 0.051 |
| Quantity of Particles of 5 μ or less size in Catalsyst Solid (%) | 1 | 1 | 1 | 1 | 1 | 1 |
| E | 1300 | 1080 | 1320 | 650 | 510 | 700 |
| HI | 95 | 95 | 95 | 89 | 91 | 90 |
| MFR | 3.5 | 4.8 | 3.9 | 7.9 | 7.1 | 7.7 |

COMPARATIVE EXAMPLES 23 TO 25

In Comparative Example 23, the procedure of Comparative Example 13 or 14 was repeated except using IAE in an equimolar amount to Ti to remove aluminum compounds instead of NBE and then using titanium tetrachloride in a quantity of 40% by volume for the activation.

In Comparative Example 24, the quantity of IAE used at that time was decreased to 0.5 mol to 1 mol of Ti.

In Comparative Example 25, the procedure of Comparative Example 23 was repeated except adding further IAE in a quantity of 0.3 mol to Ti at the time of treating with titanium tetrachloride.

The results obtained are shown in Table IX.

Table IX

|  | Comparative Example | | |
|---|---|---|---|
|  | 23 | 24 | 25 |
| Al/Ti (Molar Ratio) | 0.017 | 0.023 | 0.017 |
| Quantity of Particles of 5 μ or less size in Catalyst Solid (%) | 7 | 4 | 6 |
| E | 1680 | 860 | 1520 |
| HI | 97 | 95 | 97 |
| MFR | 4.9 | 3.8 | 5.3 |

It is apparent from these experimental results that the catalyst of the present invention has an activity similar to or same as the catalysts produced by the known methods in spite of that the quantity of IAE used is small in the former and the performance of the catalyst is markedly lowered if the quantity of IAE is decreased in the known method of the prior art. Moreover, it will be understood that there is no effect of improvement even if the procedure of the present invention is applied to the known method.

What is claimed is:

1. A process for the production of a catalyst component for use in polymerization of alpha-olefins which comprises:

reducing titanium tetrachloride with a mixture of a dialkyl aluminum halide with an alkyl aluminum dihalide, wherein said dialkyl aluminum halide is employed in an amount of at least 1 mole per 1 mole of titanium tetrachloride and said alkyl aluminum dihalide is employed in an amount within the range of from 0.3 to 1.2 moles per 1 mole of titanium tetrachloride, to obtain a violet titanium trichloride reduced solid containing aluminum compounds;

removing aluminum compounds from said violet titanium trichloride reduced solid; and thereafter contacting said violet titanium trichloride reduced solid in an inert diluent with an activator selected from the group consisting of a complex of diisoamyl ether and titanium tetrachloride, and a mixture of diisoamyl ether and titanium tetrachloride at a temperature within the range of from −30° to 100° C for at least 30 minutes, wherein the mole ratio of diisoamyl ether to titanium trichloride is at least 0.1 and the concentration of titanium tetrachloride in the diluent is maintained at at least 1 volume percent.

2. A process according to claim 1 wherein the aluminum compounds are removed by washing with a complexing agent.

3. A process according to claim 2 wherein the complexing agent is selected from the group consisting of ethers, thioethers, thiols, organo-phosphorus compounds, organo nitrogen compounds, ketones and esters.

4. A process according to claim 3 wherein the complexing agent is di-n-butyl ether.

5. A process according to claim 1 wherein the activator is a complex of diisoamyl ether and titanium tetrachloride.

6. A process according to claim 1 wherein the activator is a mixture of diisoamyl ether and titanium tetrachloride.

7. A process according to claim 1, wherein, in said contacting of violet titanium trichloride reduced solid in inert diluent with said activator, the mole ratio of diisoamyl ether to titanium trichloride is within the range of 0.1 to 0.6, the concentration of titanium tetrachloride in the diluent is at least 5 volume percent and the reduced solid concentration in the diluent is at least 50 grams per liter.

* * * * *